United States Patent
Bramante

(10) Patent No.: US 7,882,388 B2
(45) Date of Patent: Feb. 1, 2011

(54) DUAL INDEPENDENT NON VOLATILE MEMORY SYSTEMS

(75) Inventor: William J. Bramante, Apex, NC (US)

(73) Assignee: Sierra Wireless America, Inc., Carlsbad, CA (US)

( * ) Notice: Subject to any disclaimer, the term of this patent is extended or adjusted under 35 U.S.C. 154(b) by 279 days.

(21) Appl. No.: 12/195,570

(22) Filed: Aug. 21, 2008

(65) Prior Publication Data

US 2010/0050014 A1    Feb. 25, 2010

(51) Int. Cl.
G06F 11/00 (2006.01)
(52) U.S. Cl. ............................................. 714/5
(58) Field of Classification Search .................. None
See application file for complete search history.

(56) References Cited

U.S. PATENT DOCUMENTS

| | | | |
|---|---|---|---|
| 3,668,644 A | | 6/1972 | Looschen |
| 4,488,223 A | * | 12/1984 | Chiwaki ........................ 714/5 |
| 5,611,042 A | | 3/1997 | Lordi |
| 5,724,501 A | * | 3/1998 | Dewey et al. .................. 714/9 |
| 6,363,502 B1 | * | 3/2002 | Jeddeloh ...................... 714/52 |
| 6,499,091 B1 | * | 12/2002 | Bergsten ..................... 711/162 |
| 7,103,796 B1 | * | 9/2006 | Kekre et al. ................... 714/6 |
| 7,188,272 B2 | * | 3/2007 | Bartfai et al. .................. 714/6 |
| 7,475,184 B2 | * | 1/2009 | Lee ........................... 711/103 |
| 7,680,982 B2 | * | 3/2010 | Ash et al. .................... 711/113 |
| 7,694,177 B2 | * | 4/2010 | Zohar et al. ................... 714/12 |
| 2002/0023199 A1 | * | 2/2002 | Biessener et al. ............ 711/162 |
| 2004/0098637 A1 | * | 5/2004 | Duncan et al. ................. 714/6 |
| 2004/0193948 A1 | * | 9/2004 | Ono ............................. 714/6 |
| 2004/0268177 A1 | * | 12/2004 | Ji et al. ......................... 714/6 |
| 2005/0081091 A1 | * | 4/2005 | Bartfai et al. .................. 714/6 |
| 2006/0253731 A1 | * | 11/2006 | Petruzzo ....................... 714/6 |
| 2008/0172572 A1 | * | 7/2008 | Beardsley et al. .............. 714/6 |

FOREIGN PATENT DOCUMENTS

EP    1703400 A    9/2006

OTHER PUBLICATIONS

Microsoft Computer Dictionary, 4th Ed., 1999, Microsoft Press, p. 313.*

* cited by examiner

Primary Examiner—Christopher S McCarthy
(74) Attorney, Agent, or Firm—Gregory Stephens

(57) ABSTRACT

Disclosed is a method, system, and computer readable medium for restoring a failed non-volatile memory (NVM) system in a wireless device having a primary NVM system and a secondary NVM system. The method does not require a reboot of the wireless device. A NVM manager application detects a failure in either of the NVM systems and determines which NVM system has failed. If the primary NVM system has failed then the NVM manger switches the wireless device to operate using the secondary NVM system, restores the primary NVM system using data from the secondary NVM system, then switches the wireless device back to the primary NVM system once it has been restored. If the secondary NVM system has failed then the NVM manager restores the secondary NVM system using data from the primary NVM system.

12 Claims, 5 Drawing Sheets

DUAL INDEPENDENT NON VOLATILE MEMORY SYSTEMS

BACKGROUND

Non-Volatile Memory (NVM) corruption or failure is often a problem in wireless devices such as mobile phones and wireless RF modules that are integrated into other application specific devices. NVM failure is more prevalent in wireless devices that are exposed to random power loss. Typically, the wireless device will no longer operate. If the device can still operate, it will do so with corrupted data which can include critical calibration data.

What is needed is an NVM system that can operate during a failed NVM event and restore itself seamlessly without having to reboot the device.

SUMMARY

Disclosed is a method, system, and computer readable medium for restoring a failed non-volatile memory (NVM) system in a wireless device having a primary NVM system and a secondary NVM system. The method does not require a reboot of the wireless device. A NVM manager application detects a failure in either of the NVM systems and determines which NVM system has failed. If the primary NVM system has failed then the NVM manger switches the wireless device to operate using the secondary NVM system only, restores the primary NVM system using data from the secondary NVM system, then switches the wireless device back to the primary NVM system once it has been restored.

If the secondary NVM system has failed then the NVM manager restores the secondary NVM system using data from the primary NVM system. This is done in the background while the primary NVM is operating normally. In either case, the wireless device need not reboot itself to restore the NVM system.

The NVM manager also synchronizes the primary and secondary NVM systems through duplicate NVM writes to and reads from both the primary and secondary NVM systems. The NVM manager compares the results of read requests of each NVM system to ensure that they are synchronized. If the read results are not synchronized the NVM manager will update the secondary NVM data stored in the secondary NVM system to match the primary NVM data if the primary NVM data is valid and does not match the secondary NVM data, or update the primary NVM data stored in the primary NVM system to match the secondary NVM data if the secondary NVM data is valid and the primary NVM data is not valid.

The NVM manager restores an NVM system by erasing all sectors of the storage space of the failed NVM system, initializing an embedded file system of the failed NVM system, rebuilding the embedded file system of the failed NVM system, and copying data from the NVM system currently being used to operate the wireless device to the embedded file system of the failed NVM system.

DETAILED DESCRIPTION OF THE INVENTION

The general idea of the invention is to include a secondary non-volatile memory (NVM) in addition to the primary NVM system within a wireless device such as an RF module device. The purpose of the secondary NVM system is to provide a seamless backup if and when the primary NVM system becomes corrupted or fails. In addition to the secondary NVM system, an NVM manager component is included to detect failures and manage the transitions between the primary and secondary NVM systems when a failure is detected. When a failure or corruption is detected, the NVM manger will switch the RF module device to the other NVM system while it repairs the failed or corrupted NVM system in the background. If the failed NVM system was the primary then it will be brought back on-line once it has been repaired and updated.

Figure 1:
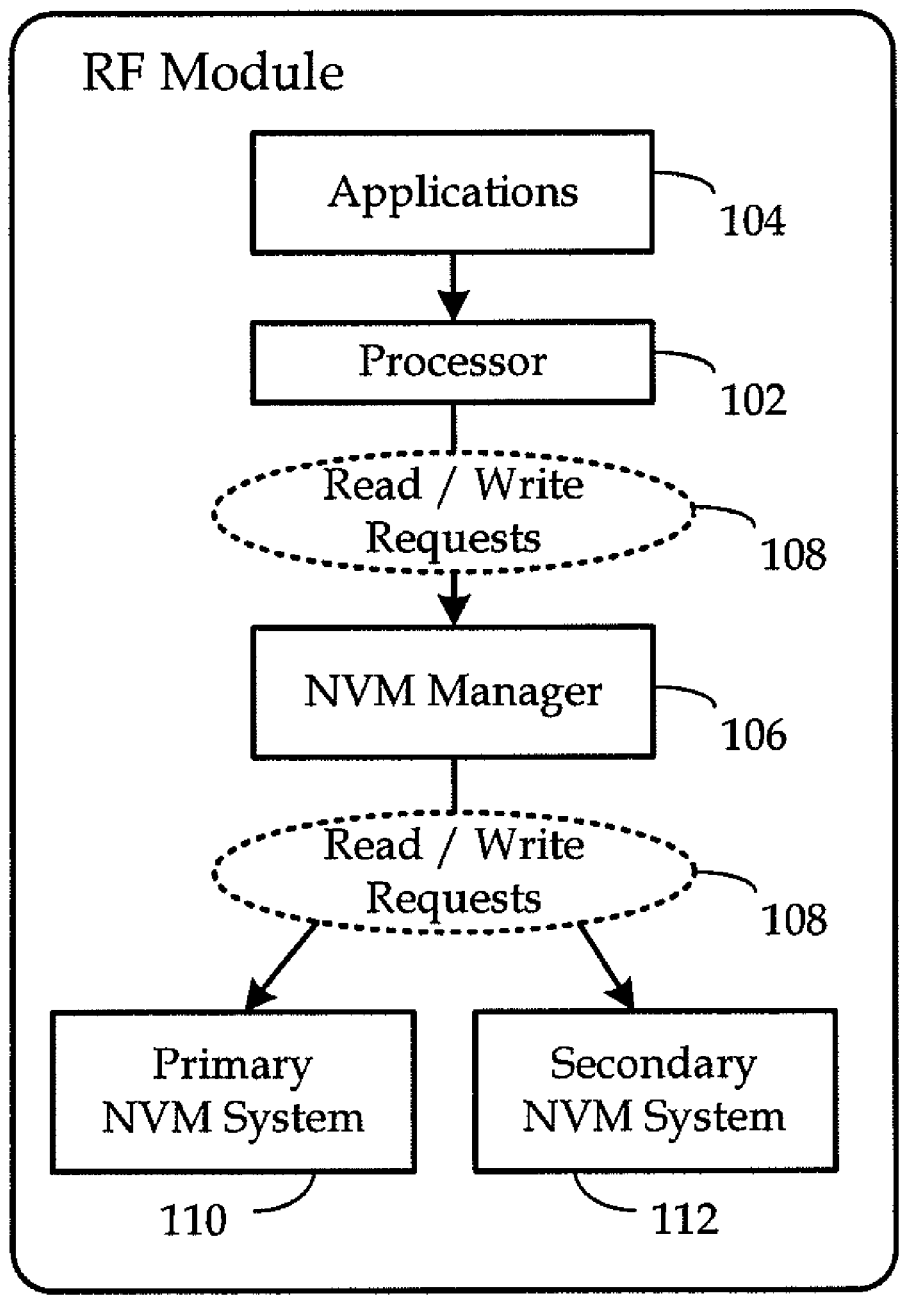
FIG. 1 is an illustration of a typical RF module showing components utilized in the embodiments of the invention.

FIG. 1 is an illustration of a typical RF module 100 showing components utilized in the embodiments of the invention. The RF module 100 contains many more components than are illustrated. The components not shown have been omitted for ease of illustration purposes. In general, one or more applications 104 will be executing on the RF module device 100 under the control of a processor 102. There is also an NVM manager 106 that interfaces between the processor 102 and a primary NVM system 110 and a secondary NVM system 112. The applications 104 periodically send read and write requests 108 via the processor 102 to the primary NVM system 110. Under the present invention, the read and write requests 108 will be passed through the NVM manager 106. The NVM manager 106 will route the requests to both the primary 110 and secondary 112 NVM systems thus maintaining a redundant or shadow NVM system that can be brought into operation should the other fail. The NVM manager 106 is also responsible for detecting any such NVM failures or corruptions, managing the transition between the primary 110 and secondary 112 NVM systems, and restoring the corrupt or failed NVM system in the background.

Figure 2:
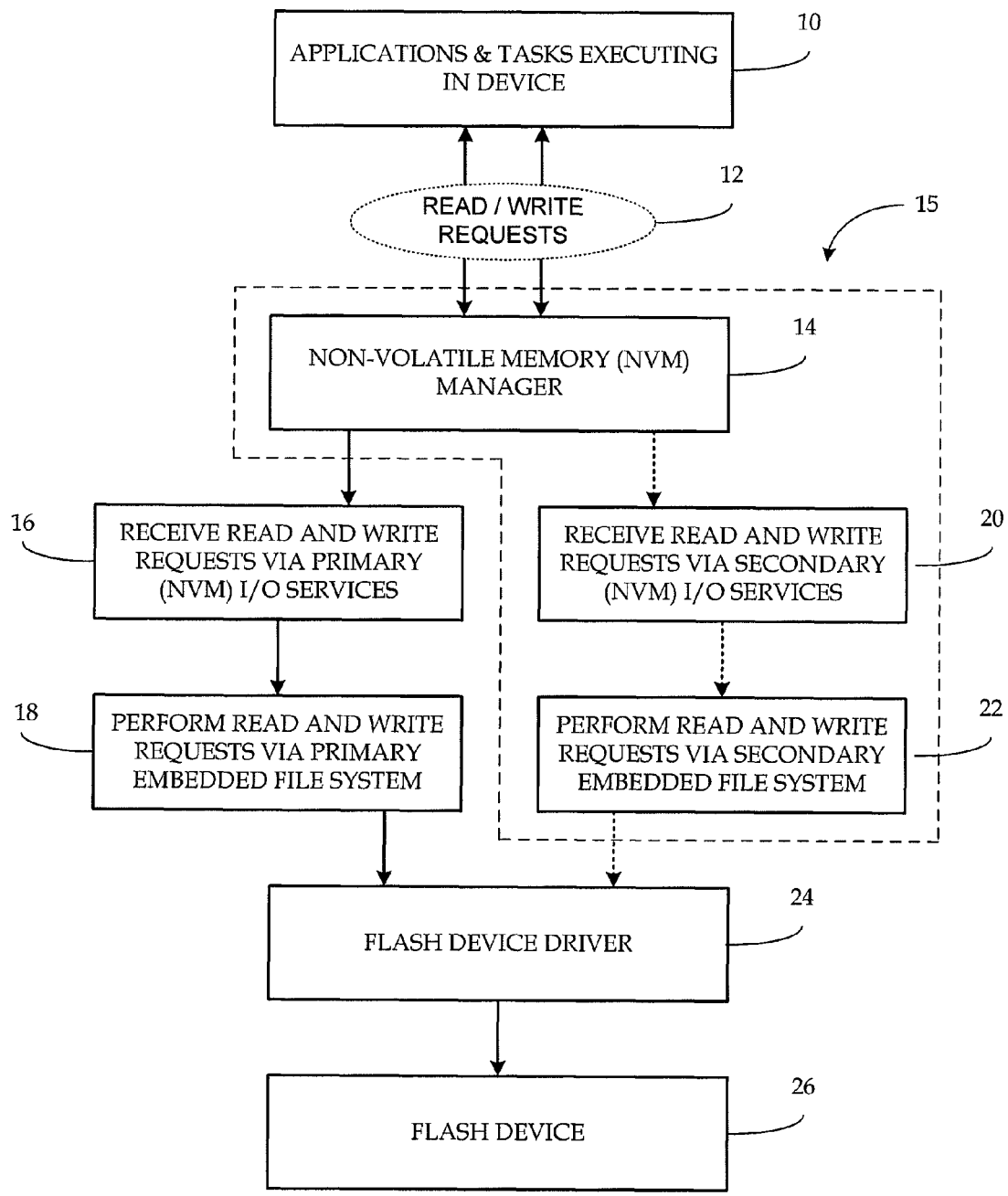
FIG. 2 is a logic diagram that illustrates the typical operation of an NVM system in a wireless device according to embodiments of the invention.

FIG. 2 is a logic diagram that illustrates the typical operation of an NVM system in a wireless device according to embodiments of the invention. The section 15 that is outlined by a dashed line indicates a departure from the known prior art. The logic diagram starts from the assumption that one or more tasks are executing 10 within the RF module device. During execution, the applications will often make read and write requests 12 to a non volatile memory (NVM) system. In the prior art, there is only one NVM system with which to cooperate. In the embodiments herein, there is a primary NVM and a secondary NVM that are under the control of an NVM manager. Thus, the read and write requests are filtered through the NV manager 14. The NVM manager then relays the requests to both the primary 16 and secondary 20 NVM systems. Each NVM system then independently performs the read and write requests using their own embedded file systems 18, 22. While each NVM system performs the requested tasks, only one (typically the primary) is responsible for the results. The purpose of the other NVM system is to provide an up to date synchronized NVM system that can be seamlessly invoked should the 'primary' NVM system experience data corruption or another type of failure. That is why the activity is shown using dashed lines. The results of the embedded file system operations are forwarded to a flash device driver 24 and on to the flash device itself 26.

It is the responsibility of the NVM manager to determine and control which NVM system is active and to repair or restore an NVM system that has been corrupted.

Figure 3:
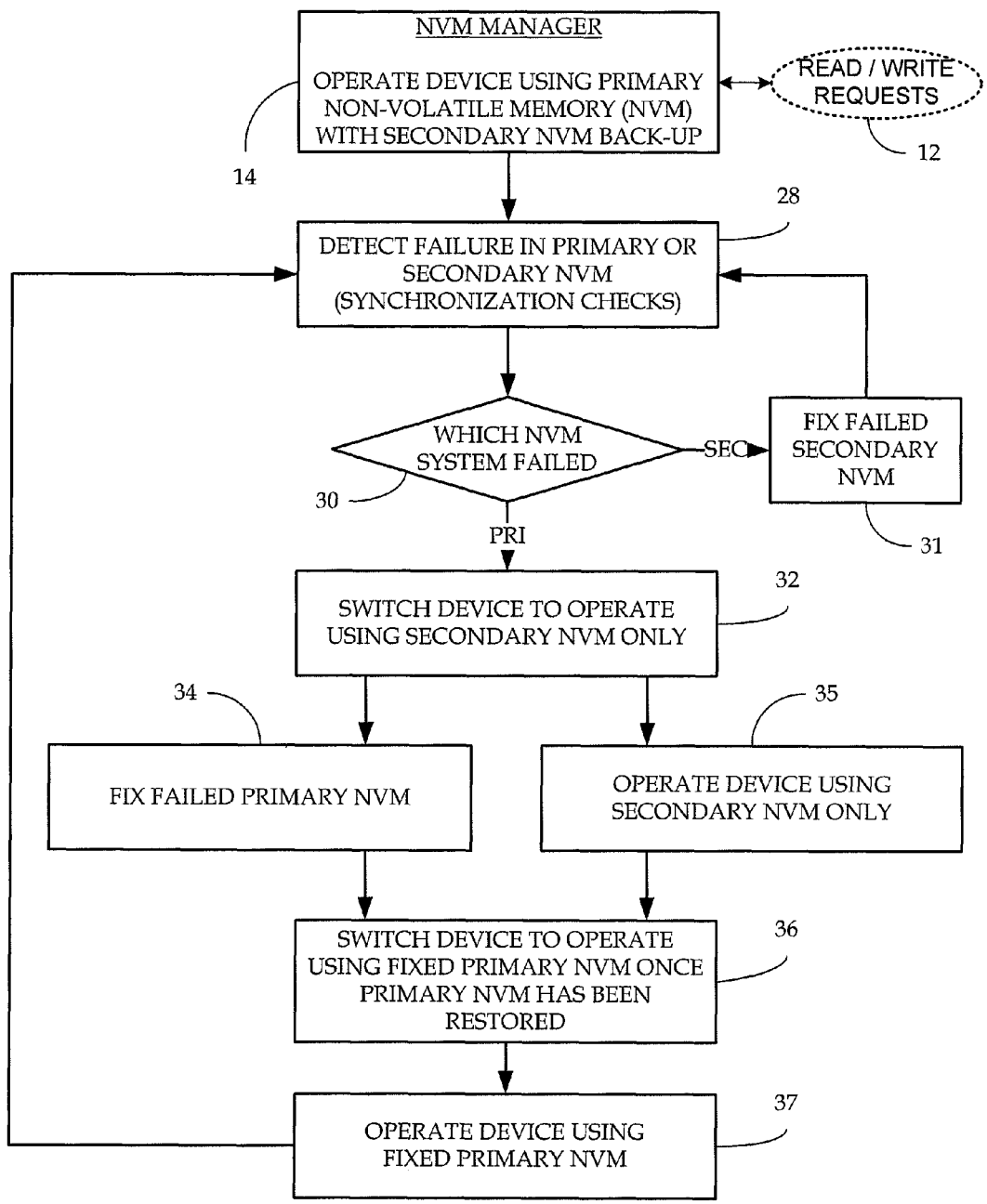
FIG. 3 is a logic diagram that illustrates the operation of the NVM manager according to embodiments of the invention.

FIG. 3 is a logic diagram that illustrates the operation of the NVM manager according to embodiments of the invention. Prior to the detection of a failure of an NVM system, the NVM manager operates the wireless device using a primary NVM system with a backup secondary NVM system 14. During operation, NVM read and write requests 12 are communicated to the NVM manager. Upon detection of a failure 28 of an NVM system, the NVM manager first determines which NVM system has failed 30. Such failures are characterized as fatal NVM system failures. Fatal NVM system failure detection is typically designed in, with the error handling of "reboot". This invention handles the fatal NVM system failures by initiating restoration on failed NVM system without having to reboot.

If the secondary NVM has failed, there is no need to interrupt the operation of the wireless device since the primary NVM system is still operating normally. In this situation, the secondary NVM system is restored 31 in the background while the primary NVM system continues to operate. Once restored, the device continues to operate normally until another failure of either NVM system is detected 28.

If the primary NVM system has failed the NVM manager will cause the device to switch to the secondary NVM system 32. No re-boot is necessary and the device continues to operate 35 as if no failure occurred. In the background, the primary NVM system is restored (fixed) 34 using current data from the secondary NVM system. Upon completion of primary NVM system restoration, the NVM manager switches to operate the wireless device using the restored primary NVM system 36, again without rebooting. The restored primary NVM system is used to operate the device 37 until a failure of either NVM system is again detected 28.

Figure 4:
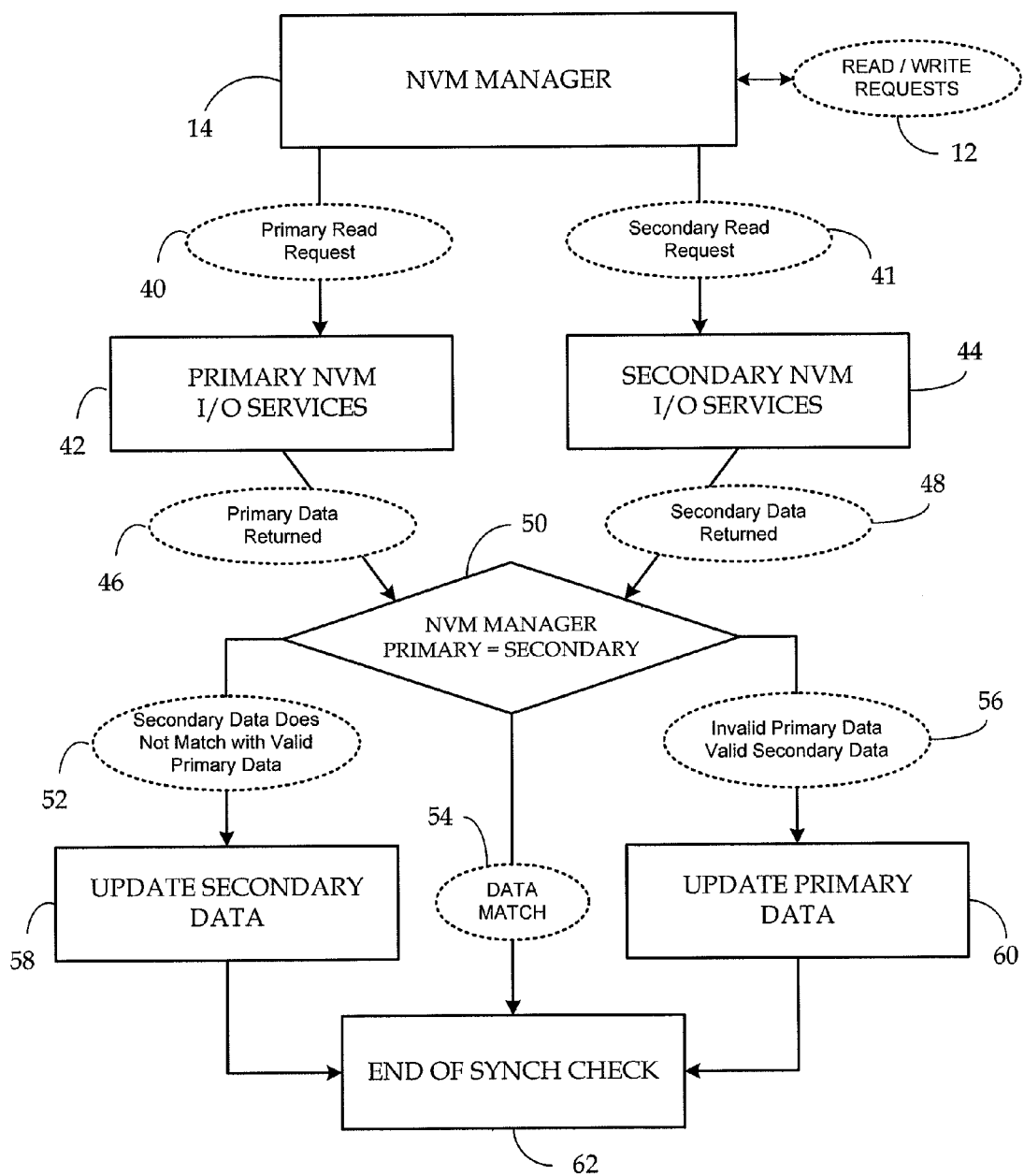
FIG. 4 is a logic diagram that illustrates the operation of the NVM manager synchronization process according to embodiments of the invention.

FIG. 4 is a logic diagram that illustrates the operation of the NVM manager synchronization process according to embodiments of the invention. As described earlier, the NVM manager 14 receives all read/write requests 12 intended for the NVM system. Upon receiving an NVM read request, the NVM manager 14 communicates a primary read request 40 to the primary NVM input/output services 42, and a duplicate secondary read request 41 to the secondary NVM input/output services 44.

Both the primary 42 and secondary 44 NVM I/O services will return primary data 46 and secondary data 48 respectively to the NVM manager. The NVM manager will then compare 50 the primary NVM data to the secondary NVM data. If the primary NVM data matches 54 the secondary NVM data, then the synchronization check is complete 62 and everything is as it should be. However, if the secondary NVM data does not match the primary NVM data, and the primary NVM data is valid 52, the secondary NVM is updated 58 to match the primary NVM data. If the secondary NVM data does not match the primary NVM data, and the secondary NVM data is valid 56, then the primary NVM is updated 58 to match the secondary NVM data. Validity of data may be determined using checksums or other methods appreciated by those skilled in the art.

Figure 5:
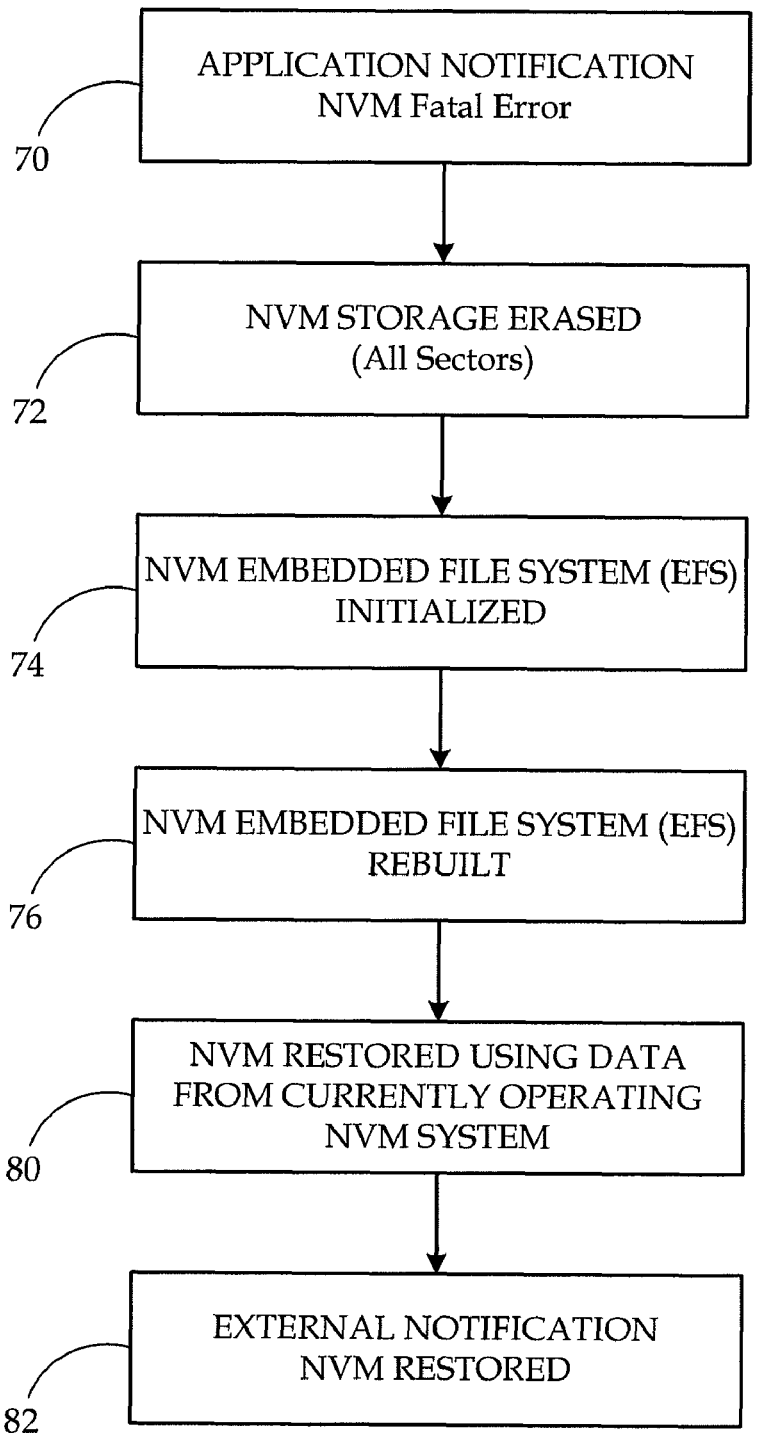
FIG. 5 is a logic diagram that illustrates the operation of the NVM manager recovery process according to embodiments of the invention.

FIG. 5 is a logic diagram that illustrates the operation of the NVM manager restoration process according to embodiments of the invention. Upon detection of a failure of an NVM system, primary or secondary, an NVM error notification 70 is communicated. If the failed NVM system is the primary NVM system, the NVM manager will switch to operate the wireless device using the secondary NVM system without rebooting. If the failed NVM system is a secondary NVM system, the NVM manager will continue to operate the wireless device using the primary NVM system. The failed NVM system will then be restored.

All sectors of NVM storage space of the failed system are erased 72. The NVM embedded file system is initialized 74 and rebuilt 76. Once the NVM embedded file system is rebuilt, the data is restored using data from the currently operating NVM system 80. An external notification 82 is communicated once the failed NVM system has been restored indicating that it is synchronized with the other NVM system and ready to be used.

In the event that the restoration of a failed non-volatile memory system is interrupted by a loss of power, the restoration may be restarted once power is restored.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any prompts associated with the present invention may be presented and responded to via a graphical user interface (GUI) presented on the display of the mobile communications device or the like. Prompts may also be audible, vibrating, etc.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method of restoring a failed non-volatile memory (NVM) system in a wireless device having a primary NVM system and a secondary NVM system wherein the method does not require a reboot of the wireless device, the method comprising:
   detecting a failure in either of the NVM systems;
   determining which NVM system has failed wherein if the primary NVM system has failed then:
      switching the wireless device to operate using the secondary NVM system;
      restoring the primary NVM system using data from the secondary NVM system; and
      switching the wireless device to operate using the primary NVM system once it has been restored,
   otherwise, if the secondary NVM system has failed then:
      restoring the secondary NVM system using data from the primary NVM system,
   wherein restoring a failed NVM system comprises:
      erasing all sectors of the storage space of the failed NVM system;
      initializing an embedded file system of the failed NVM system;
      rebuilding the embedded file system of the failed NVM system; and
      copying data from the NVM system currently being used to operate the wireless device to the embedded file system of the failed NVM system.

2. The method of claim 1 further comprising synchronizing the primary and secondary NVM systems through duplicate NVM writes to both the primary and secondary NVM systems.

3. The method of claim 2 wherein synchronizing the primary and secondary NVM systems further comprises performing duplicate NVM reads of both the primary and secondary NVM systems and comparing the results of the reads to one another.

4. The method of claim 3 wherein synchronizing the primary and secondary NVM systems further comprises:
   receiving primary and secondary NVM data based on a read request communicated to the primary and secondary NVM systems respectively;
   comparing the primary NVM data with the secondary NVM data;
   updating the secondary NVM data stored in the secondary NVM system to match the primary NVM data if the primary NVM data is valid and does not match the secondary NVM data;
   updating the primary NVM data stored in the primary NVM system to match the secondary NVM data if the secondary NVM data is valid and does not match the primary NVM data; and
   ending the synchronization process if the primary NVM data matches the secondary NVM data.

5. A tangible computer readable storage medium containing a software program for restoring a failed non-volatile memory (NVM) system in a wireless device having a primary NVM system and a secondary NVM system wherein no reboot is required of the wireless device, the computer readable medium comprising:
　computer program code for detecting a failure in either of the NVM systems;
　computer program code for determining which NVM system has failed wherein if the primary NVM system has failed then:
　　computer program code for switching the wireless device to operate using the secondary NVM system;
　　computer program code for restoring the primary NVM system using data from the secondary NVM system; and
　　computer program code for switching the wireless device to operate using the primary NVM system once it has been restored,
otherwise, if the secondary NVM system has failed then:
　computer program code for restoring the secondary NVM system using data from the primary NVM system,
　wherein the computer program code for restoring a failed NVM system comprises:
　　computer program code for erasing all sectors of the storage space of the failed NVM system;
　　computer program code for initializing an embedded file system of the failed NVM system;
　　computer program code for rebuilding the embedded file system of the failed NVM system; and
　　computer program code for copying data from the NVM system currently being used to operate the wireless device to the embedded file system of the failed NVM system.

6. The computer readable medium of claim 5 further comprising computer program code for synchronizing the primary and secondary NVM systems through duplicate NVM writes to both the primary and secondary NVM systems.

7. The computer readable medium of claim 6 wherein the computer program code for synchronizing the primary and secondary NVM systems further comprises computer program code for performing duplicate NVM reads of both the primary and secondary NVM systems and computer program code for comparing the results of the reads to one another.

8. The computer readable medium of claim 7 wherein the computer program code for synchronizing the primary and secondary NVM systems further comprises:
　computer program code for receiving primary and secondary NVM data based on a read request communicated to the primary and secondary NVM systems respectively;
　computer program code for comparing the primary NVM data with the secondary NVM data;
　computer program code for updating the secondary NVM data stored in the secondary NVM system to match the primary NVM data if the primary NVM data is valid and does not match the secondary NVM data;
　computer program code for updating the primary NVM data stored in the primary NVM system to match the secondary NVM data if the secondary NVM data is valid and does not match the primary NVM data; and
　computer program code for ending the synchronization process if the primary NVM data matches the secondary NVM data.

9. A system for restoring a failed non-volatile memory (NVM) system in a wireless device having a primary NVM system and a secondary NVM system wherein the system does not require a reboot of the wireless device, the system comprising:
　a processor for controlling the operation of the wireless device;
　a primary NVM system comprised of a an I/O services component and an embedded file system component;
　a secondary NVM system comprised of a an I/O services component and an embedded file system component; and
　a NVM manager application coupled with the processor and controlling the operation of the primary and secondary NVM systems by:
　　detecting a failure in either of the NVM systems;
　　determining which NVM system has failed wherein if the primary NVM system has failed then:
　　　switching the wireless device to operate using the secondary NVM system;
　　　restoring the primary NVM system using data from the secondary NVM system; and
　　　switching the wireless device to operate using the primary NVM system once it has been restored,
　otherwise, if the secondary NVM system has failed then:
　　restoring the secondary NVM system using data from the primary NVM system,
　　wherein the NVM manager restores a failed NVM system by:
　　　erasing all sectors of the storage space of the failed NVM system;
　　　initializing an embedded file system of the failed NVM system;
　　　rebuilding the embedded file system of the failed NVM system; and
　　　copying data from the NVM system currently being used to operate the wireless device to the embedded file system of the failed NVM system.

10. The system of claim 9 wherein the NVM manager further synchronizes the primary and secondary NVM systems through duplicate NVM writes to both the primary and secondary NVM systems.

11. The system of claim 10 wherein the NVM manager further synchronizes the primary and secondary NVM systems by performing duplicate NVM reads of both the primary and secondary NVM systems and comparing the results of the reads to one another.

12. The system of claim 11 wherein the NVM manager further synchronizes the primary and secondary by:
　receiving primary and secondary NVM data based on a read request communicated to the primary and secondary NVM systems respectively;
　comparing the primary NVM data with the secondary NVM data;
　updating the secondary NVM data stored in the secondary NVM system to match the primary NVM data if the primary NVM data is valid and does not match the secondary NVM data;
　updating the primary NVM data stored in the primary NVM system to match the secondary NVM data if the secondary NVM data is valid and does not match the primary NVM data; and
　ending the synchronization process if the primary NVM data matches the secondary NVM data.

* * * * *